United States Patent
Ghosh et al.

(10) Patent No.: US 10,536,264 B2
(45) Date of Patent: Jan. 14, 2020

(54) EFFICIENT CRYPTOGRAPHICALLY SECURE CONTROL FLOW INTEGRITY PROTECTION

(71) Applicant: Intel Corporation, Santa Clara, CA (US)

(72) Inventors: Santosh Ghosh, Hillsboro, OR (US); Manoj R Sastry, Portland, OR (US); Jesse R. Walker, Portland, OR (US); Ravi L. Sahita, Beaverton, OR (US); Abhishek Basak, Hillsboro, OR (US); Vedvyas Shanbhogue, Austin, TX (US); David M. Durham, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 358 days.

(21) Appl. No.: 15/392,324

(22) Filed: Dec. 28, 2016

(65) Prior Publication Data

US 2018/0183574 A1    Jun. 28, 2018

(51) Int. Cl.
*H04L 9/06*    (2006.01)
*G06F 21/72*   (2013.01)
*G06F 21/44*   (2013.01)

(52) U.S. Cl.
CPC ............ *H04L 9/0618* (2013.01); *G06F 21/44* (2013.01); *G06F 21/72* (2013.01)

(58) Field of Classification Search
None
See application file for complete search history.

(56) References Cited

U.S. PATENT DOCUMENTS

| | | | |
|---|---|---|---|
| 2007/0237327 A1* | 10/2007 | Taylor | H04L 9/0662 380/37 |
| 2015/0280909 A1* | 10/2015 | Mathew | G09C 1/00 380/278 |
| 2016/0094552 A1* | 3/2016 | Durham | G06F 21/00 713/171 |
| 2016/0171211 A1* | 6/2016 | Chen | G06F 12/1408 726/23 |

* cited by examiner

*Primary Examiner* — Kambiz Zand
*Assistant Examiner* — Arezoo Sherkat
(74) *Attorney, Agent, or Firm* — Schwegman Lundberg & Woessner, P.A.

(57) ABSTRACT

Embodiments include a computing processor control flow enforcement system including a processor, a block cipher encryption circuit, and an exclusive-OR (XOR) circuit. The control flow enforcement system uses a block cipher encryption to authenticate a return address when returning from a call or interrupt. The block cipher encryption circuit executes a block cipher encryption on a first number including an identifier to produce a first encrypted result and executes a block cipher encryption on a second number including a return address and a stack location pointer to produce a second encrypted result. The XOR circuit performs an XOR operation on the first encrypted result and the second encrypted result to produce a message authentication code tag.

20 Claims, 7 Drawing Sheets

EFFICIENT CRYPTOGRAPHICALLY SECURE CONTROL FLOW INTEGRITY PROTECTION

TECHNICAL FIELD

Embodiments described herein generally relate to computing, and in particular, to systems and methods for control flow integrity protection.

BACKGROUND

Return-Oriented Programming (ROP) is a technique used by malicious agents to compromise a computing system in which code is non-writable and data is non-executable. In ROP, a stored return address is maliciously changed so that malicious code is executed upon the computing system performing a call-return rather than the original calling code continuing to be executed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings, in which.

DETAILED DESCRIPTION

In the following description, for purposes of explanation, numerous specific details are set forth in order to provide a thorough understanding of some example embodiments. It will be evident, however, to one skilled in the art, that the present disclosure may be practiced without these specific details.

Various approaches to control flow enforcement in computing processors have been proposed to prevent malicious hijacking of computing processors using ROP. These approaches may add additional computing performance overhead and latency to instruction execution and memory access. In approaches that do not encrypt the return address, a malicious agent may modify the return address. The present inventors have recognized that there is a need for an improved efficient approach to control flow integrity protection that is cryptographically secure and does not add significant processing overhead and latency.

In an embodiment, a block cipher circuit is combined with a message authentication circuit to provide security to protect the integrity of a return address. The block cipher may be a lightweight cipher to reduce computational complexity, reduce clock cycles to execute the block cipher, and reduce integrated circuit floorplan area dedicated to the block cipher circuit. For example, a 128 bit secure PRINCE block cipher circuit may be combined with a circuit implementing an exclusive-OR (XOR) message authentication code (MAC) technique to protect the integrity of the return address in a single clock cycle, and thereby provide protection against a replay attack including a copy-and-overwrite attack to corrupt an execution of code by a target device. In a replay attack, an attacker may copy a call-stack during a program execution, however, the protection provided by the embodiment may prevent the attacker from utilizing the copied call-stack at any later time during execution. PRINCE is a lightweight block cipher with a low number of rounds (12 rounds) for encrypting a 64-bit block with a 128-bit key. PRINCE has well analyzed linear layers and provides a good area-latency product, and may be implemented in electronic circuitry as a single-clock cryptographic engine. XOR-MAC is a message authentication technique that independently encrypts a random number or a counter value and message blocks with their unique identifiers, and then XORs the encrypted outputs to generate a tag. The tag together with the random number or counter value is a MAC of the entire message including all the message blocks.

Embodiments may include a single cycle cryptographically secure solution to address control flow integrity attacks. Embodiments may include Internet of Things (IoT) applications, for example, smart sensors and appliances, where computing processor size and performance capabilities are limited.

Figure 1:
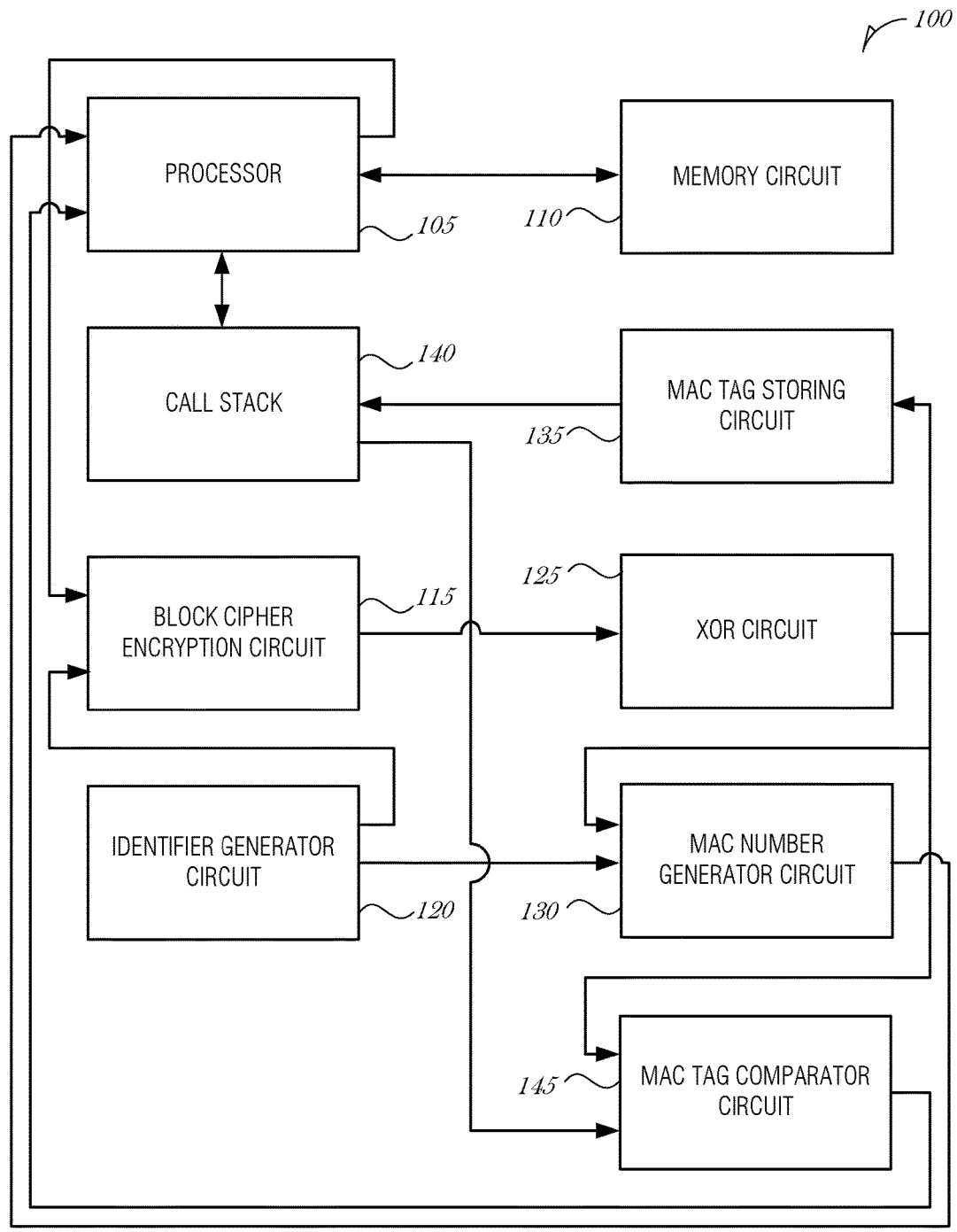
FIG. 1 is a block diagram illustrating a cryptographically secure control flow enforcement system, according to an embodiment.

FIG. 1 is a block diagram illustrating a cryptographically secure control flow enforcement system 100, according to an embodiment. The control flow enforcement system 100 includes a processor 105 and a memory circuit 110. The processor 105 may be a computing processor configured to read executable instructions from the memory circuit 110, execute the executable instructions, and read and write data to and from the memory circuit 110. The processor 105 may also control, receive data from, and transmit data to one or more additional circuits of the control flow enforcement system 100 via one or more buses.

A block cipher encryption circuit 115 may execute a block cipher encryption on a first number including an identifier to produce a first encrypted result and execute a block cipher encryption on a second number including a return address and a stack location pointer to produce a second encrypted result. The use of the identifier together with the stack location pointer may provide robustness of control flow integrity to protect against a replay attack. In various embodiments, the block cipher encryption circuit 115 may execute a block cipher encryption on more than two numbers, for example, three numbers or four numbers. In an embodiment, the block cipher encryption circuit 115 may include two block cipher encryption sub-circuits that operate in parallel using different inputs to produce different outputs. For example, a first block cipher encryption sub-circuit may execute a block cipher encryption on the first number to produce the first encrypted result while a second block cipher encryption sub-circuit executes a block cipher encryption on the second number to produce the second encrypted result. In an embodiment, the block cipher encryption circuit 115 may sequentially execute a block cipher encryption on the first number to produce the first encrypted result and execute a block cipher encryption on the second number to produce the second encrypted result while the first encrypted result is stored until the completion of the second encrypted result. The block cipher encryption circuit 115 may encrypt the first and second numbers using an encryption key, which may be a 128 bit number specified by the processor 105. The first and second numbers may be 64 bit numbers.

The block cipher encryption circuit 115 may include a secure PRINCE block cipher circuit to perform encryption of the first number and the second number to generate the first encrypted result and the second encrypted result. The block cipher encryption circuit 115 may include a plurality of PRINCE block cipher sub-circuits in parallel to operate on a plurality of input numbers in parallel with one another. The block cipher encryption circuit 115 may include one or more storage registers to store one or more input numbers and encrypted results to facilitate a single PRINCE block cipher sub-circuit to operate on the plurality of input numbers sequentially and store the plurality of encrypted results until all the desired encrypted results are completed. The block cipher encryption circuit 115 may perform the encryption of the input numbers in one clock cycle, or when a same block cipher sub-circuit operates on more than one input number sequentially, the block cipher encryption circuit 115 may perform the encryption of each input number in one clock cycle, with the total number of input numbers encrypted in a number of clock cycles not greater than the number of input numbers to be encrypted.

The first number may include an identifier r' based on a random number or a counter value r. The random number or counter value r may have 64 or fewer bits, e.g., 32 bits for an interrupt or interrupt-return operation, or 63 bits for a call or call-return operation. For a random number or counter value r having fewer than 63 bits, the random number or counter value r may be padded with zero-value bits in the least significant bits position to form a 63-bit padded random number or counter value $r'=r\|0^{31}$ where '$\|$' represents concatenation and $0^{31}$ represents a 31-bit sequence of zero-value bits. The first number may take the random number or counter value r or padded r' as the least significant bits of a 64-bit binary number, with the remaining most significant bits of the first number being zero-value bits.

The first number may be provided to the block cipher encryption circuit 115 by an identifier generator circuit 120. The identifier generator circuit 120 may include a random number generator circuit to generate a random number, and the identifier generator circuit 120 may base the first number on the generated random number. The random number may be generated from a true entropy source or obtained from a counter to achieve a single clock cycle latency. The identifier generator circuit 120 may include a counter circuit to generate a counter value and either increment or decrement the counter such that the next generated counter value is one value higher or lower, respectively, and the identifier generator circuit 120 may base the first number on the generated counter value. For example, when processing a call or interrupt, the counter circuit may be controlled to increment the counter via a counter incrementing circuit, and when processing a call-return, the counter circuit may be controlled to decrement the counter via a counter decrementing circuit.

When processing a call or call-return, the second number may include 32 binary bits of a return address (e.g., extended instruction pointer or EIP) concatenated with the least significant 31 bits of a stack location pointer (e.g., extended stack pointer or ESP) to form a 63 bit string M, as designated by $M=EIP_{31-0}\|ESP_{30-0}$. The second number may take the value M as the least significant bits with the most significant bits of the second number set as one values. Therefore, a 64-bit binary second number may be $1\|M$ where M is represented as a 63-bit binary number. The second number may be provided to the block cipher encryption circuit 115 by the processor 105. For the call and call-return operations, the first and second numbers may be represented as $0\|r$ and $1\|M$.

When processing an interrupt or interrupt-return, the second number, third number, and fourth number may be created as partitions of a larger binary number. For example, binary representations of the return address (EIP), code segment register (CS), stack segment register (SS), and stack pointer (ESP) may be concatenated together. The CS value and the SS value may be used to provide control flow integrity for the interrupt. The CS value and the SS value may also protect against a replay attack involving a return from an interrupt. Each of the EIP, CS, SS, and ESP may be 32 bits, so that the total concatenated number is 128 bits long. The 128 bit concatenated number may be padded with 55 zero-valued bits in the least significant bit positions to form a 183 bit number. This 183 bit number may then be partitioned into three numbers, a most significant number (M1), a middle number (M2), and a least significant number (M3), each of which are 61 bits in length. Before encryption, each of M1, M2, and M3 may be identified by a two bit prefix concatenated with the respective value of M1, M2, and M3, e.g., '01' for M1, '10' for M2, and '11' for M3. Each of the second number, third number, and fourth number may then be a 64 bit number comprising a one-value bit in the most significant bit position concatenated with the respective two bit identifier and M1, M2, or M3, respectively. For the interrupt and interrupt-return operations, the first through fourth numbers may be represented as $0\|r\|0^{31}$, $1\|01\|M1$, $1\|10\|M2$, and $1\|11\|M3$, respectively.

An XOR circuit 125 may receive the first and second encrypted results from the block cipher encryption circuit 115. In an embodiment, the XOR circuit 125 may receive the first encrypted result from the first block cipher encryption sub-circuit in parallel with receiving the second encrypted result from the second block cipher encryption sub-circuit. In various embodiments, the XOR circuit 125 may receive and operate on more than two encrypted results received from the block cipher encryption circuit, for example, four encrypted results. In an embodiment, the XOR circuit 125 may receive the encrypted results from the block cipher encryption circuit 115 sequentially, and store the first received one or more encrypted results until all of the encrypted results are provided by the block cipher encryption circuit 115. The XOR circuit 125 may perform an XOR operation on the received encrypted results to produce a message authentication code (MAC) tag t. The XOR operation may be a bitwise XOR operation on the binary representations of the encrypted results. In an embodiment, the XOR operation may be a 64 bit XOR operation on a 64 bit first encrypted result and a 64 bit second encrypted result. In an embodiment, the XOR operation may be a 64 bit XOR operation on a 64 bit first encrypted result, a 64 bit second encrypted result, a 64 bit third encrypted result, and a 64 bit fourth encrypted result. The MAC tag t may be taken as the most significant 32 bits of the result of the XOR operation for a call or call-return operation, or as the full 64 bits of the result of the XOR operation for an interrupt or interrupt-return operation. Thus, for a call or call-return operation, the MAC tag $t=[E_k(0\|r) \text{ XOR } E_k(1\|M)]_{63-32}$, and for an interrupt or interrupt-return operation, the MAC tag $t=E_k(0\|r\|0^{31})$ XOR $E_k(1\|01\|M1)$ XOR $E_k(1\|10\|M2)$ XOR $E_k(1\|11\|M3)$, where $E_k(\ )$ represents a block cipher encryption using key k.

A MAC number generator circuit 130 may receive the MAC tag t from the XOR circuit 125 and the random number or counter value r from the identifier generator circuit 120 and generate a MAC number as the set of the identifier and the MAC tag (t, r).

A MAC tag storing circuit 135 may receive the MAC tag t from the XOR circuit 125 and store the MAC tag t on a call-stack 140, for example, during a call operation or an interrupt operation.

A MAC tag comparator circuit 145 may compare the MAC tag received from the XOR circuit 125 with a previously stored MAC tag received from the call-stack 140. When the comparison indicates a mismatch, it may be determined that the control flow integrity has been compromised, and the processor 105 may generate a control flow integrity exception as an enforcement of the control flow. When the comparison indicates a match, it may be determined that the control flow integrity is intact, and the processor 105 may continue execution of the instruction stream normally.

Figure 2:
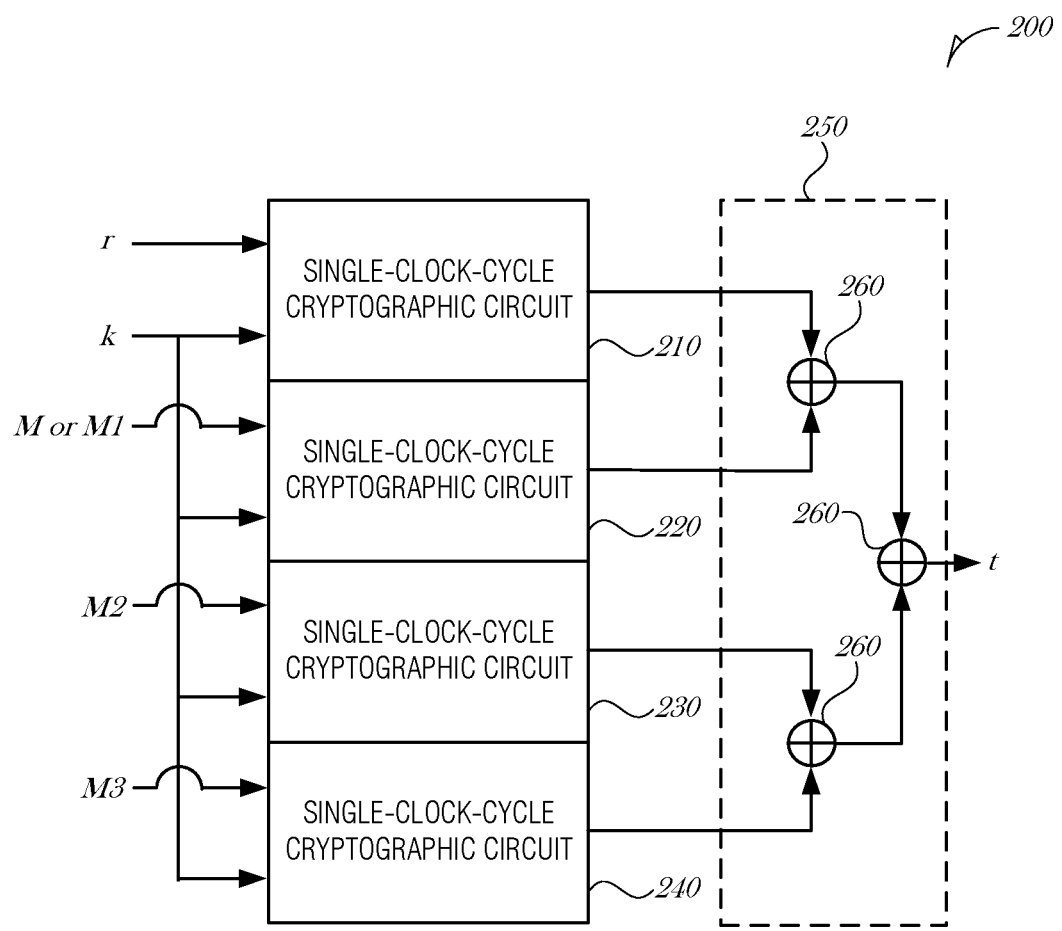
FIG. 2 is a block diagram illustrating a cryptographically secure control flow integrity system, according to an embodiment.

FIG. 2 is a block diagram illustrating a cryptographically secure control flow integrity system 200, according to an embodiment. The control flow integrity system 200 may generate at least one of a MAC tag t and a MAC number (t, r) in a single clock cycle of a computing processor. The control flow enforcement system 200 includes four single-clock-cycle cryptographic circuits 210, 220, 230, 240 in parallel with one another. Each of the single-clock-cycle cryptographic circuits 210, 220, 230, 240 may be an embodiment of the block cipher encryption circuit 115 discussed with respect to FIG. 1. Each of the cryptographic circuits 210, 220, 230, 240 encrypts an input binary number using an input encryption key, with all of the cryptographic circuits 210, 220, 230, 240 encrypting their respective input binary numbers using the same encryption key. The encryption key may be a 128 bit encryption key, and may be determined in advance.

The cryptographic circuit 210 may encrypt a first number including an identifier using the encryption key and output a first encrypted result. The identifier may be generated based on a random number or counter value r. The cryptographic circuits 220, 230, 240 may encrypt a second, third, and fourth number, respectively, using the encryption key k. In call and call-return operations, the second number may be a binary representation of the EIP and ESP concatenated together as discussed above with respect to FIG. 1, and the cryptographic circuits 230, 240 may not be utilized and configured to output zeros as their encrypted outputs. In interrupt and interrupt-return operations, the second, third, and fourth numbers may be partitions of a binary representation of the EIP, CS, SS, and ESP concatenated together as discussed above with respect to FIG. 1. The inputs to the second, third, and fourth numbers may be designed $N_{M1}$, $N_{M2}$, and $N_{M3}$, respectively. In an embodiment, each of the first number, $N_{M1}$, $N_{M2}$, and $N_{M3}$ may be a 64 bit number.

An XOR circuit 250 comprising a plurality of XOR devices 260 may perform an XOR operation on the encrypted results provided by the cryptographic circuits 220, 230, 240 to output a MAC tag t. The XOR circuit 250 may operate asynchronously so that the entire control flow integrity system 200 may produce the MAC tag t in a single clock cycle from the time that the input numbers are provided to the control flow integrity system 200, whether the control flow integrity system 200 is used for performing a call, a call-return, an interrupt, or an interrupt-return.

In some embodiments of the control flow integrity system 200, there may only be two cryptographic circuits (e.g., any pair of cryptographic circuits 210, 220, 230, and 240), or there may only be one cryptographic circuit 210. In an embodiment with only one cryptographic circuit 210, encryption of the first number, $N_{M1}$, $N_{M2}$, and $N_{M3}$ may be performed sequentially by the cryptographic circuit 210 with the results of each encryption stored until all encrypted results are available. In an embodiment with only two cryptographic circuits (e.g., any pair of cryptographic circuits 210, 220, 230, and 240), encryption of the first number and $N_{M1}$ may be performed sequentially by the cryptographic circuit 210 while encryption of $N_{M2}$ and $N_{M3}$ may be performed sequentially by the cryptographic circuit 220 with the results of each encryption stored until all encrypted results are available. In an embodiment, the cryptographic circuit 210 may perform encryption of any two of the first number, $N_{M1}$, $N_{M2}$, and $N_{M3}$ while the cryptographic circuit 220 may perform encryption of any other two of the first number, $N_{M1}$, $N_{M2}$, and $N_{M3}$. After all the encrypted results are available, the XOR circuit 250 may perform an XOR operation on all the encrypted results to output the MAC tag t.

There is a tradeoff between integrated circuit area occupied by the control flow integrity system 200 and the clock cycle latency of the control flow integrity system 200 according to the number of cryptographic circuits employed in parallel. The more cryptographic circuits employed in parallel, the larger area occupied by the control flow integrity system 200. The fewer cryptographic circuits employed in parallel, the larger the clock cycle latency of the control flow integrity system 200. For example, in an embodiment of the control flow integrity system 200 employing four PRINCE block cipher encryption circuits as the cryptographic circuits in parallel, the control flow integrity system 200 may occupy 29,000 gates and have a latency of only one clock cycle for both calls and interrupts. In an embodiment of the control flow integrity system 200 employing two PRINCE block cipher encryption circuits as the cryptographic circuits in parallel, the control flow integrity system 200 may occupy 15,000 gates and have a latency of only one clock cycle for a call operation and two clock cycles for an interrupt operation. In an embodiment of the control flow integrity system 200 employing one PRINCE block cipher encryption circuit as the cryptographic circuit, the control flow integrity system 200 may occupy 8,000 gates and have a latency of two clock cycles for a call operation and four clock cycles for an interrupt operation.

Figure 3:
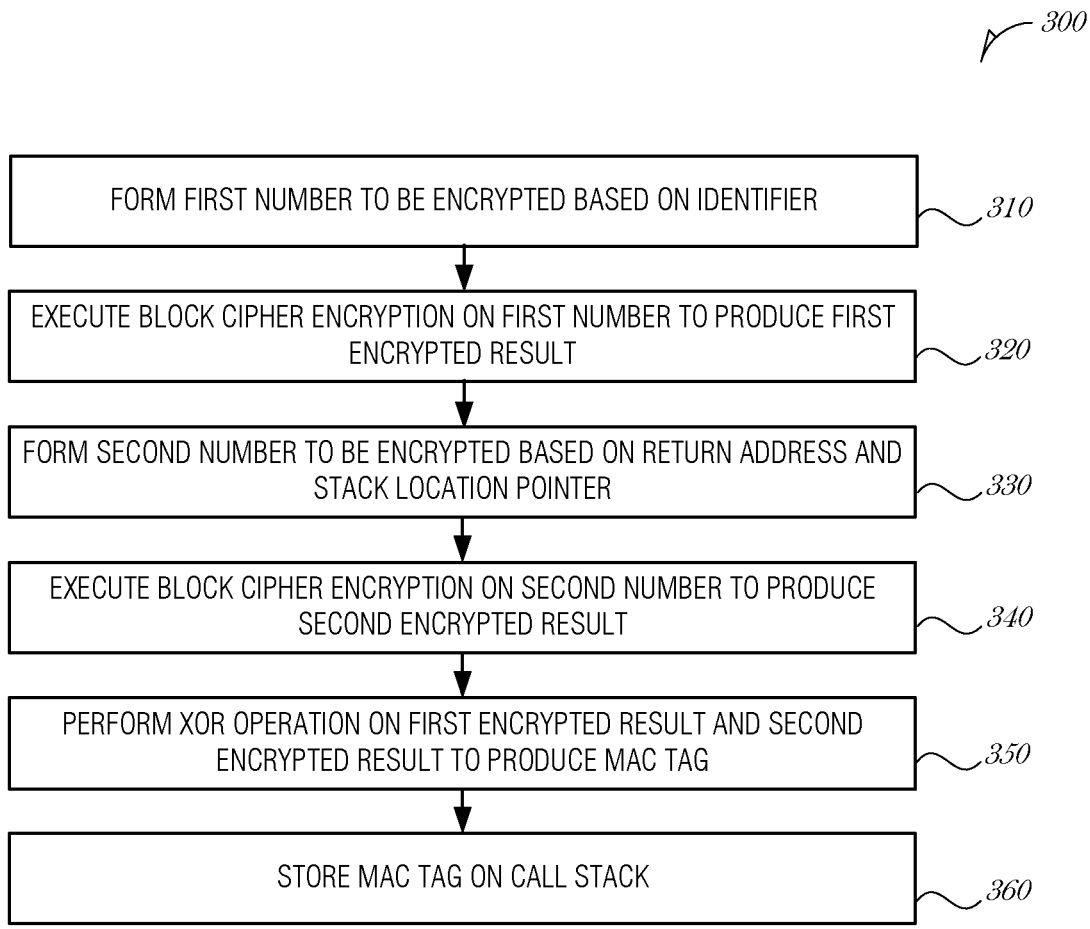
FIG. 3 is a flow diagram illustrating a method of performing cryptographically secure control flow enforcement during a call operation, according to an embodiment.

FIG. 3 is a flow diagram illustrating a method 300 of performing cryptographically secure control flow enforcement during a call operation, according to an embodiment. The method 300 of FIG. 3 may be performed by a computing processor executing a call instruction that causes a sequence of instructions beginning at a specified memory address to be executed next rather than the instructions stored in memory locations following the presently executed call instruction, in conjunction with electronic circuits configured to perform the operations as described below.

In an operation 310, a first number to be encrypted is formed based on an identifier. The identifier may be taken as a current 63-bit counter value, designated r. After the current 63-bit counter value is taken, the counter may be incremented for its next use. The first number may be formed by concatenating a zero-valued bit in a most significant bit position with r in a least significant bits position of a 64 bit number.

In an operation 320, a block cipher encryption is executed on the first number including the identifier to produce a first encrypted result. The encryption may be performed using a secure PRINCE block cipher. The encryption may be performed during a single processor clock cycle.

In an operation 330, a second number to be encrypted is formed based on a return address and a stack location pointer. A 32 bit return address may be concatenated in a most significant bits position with a least significant 31 bits of the stack location pointer in a least significant bits position to form a binary number M. The second number may be formed by concatenating a one-valued bit in a most significant bit position with M in a least significant bits position of a 64 bit number.

In an operation 340, a block cipher encryption is executed on the second number based on the return address and the stack location pointer to produce a second encrypted result. The encryption may be performed using a secure PRINCE block cipher. The encryption may be performed during a single processor clock cycle. The block cipher encryption of operation 320 and the block cipher encryption of operation 340 may be performed in parallel with one another by separate encryption circuits.

In an operation 350, an XOR operation is performed on the first encrypted result and the second encrypted result to produce a MAC tag t. The result of the XOR operation may be a 64 bit value t', and the MAC tag t may be taken as the most significant 32 bits of t'.

In an operation 360, the MAC tag t is stored on a call-stack to be later used to verify the integrity of a return address during a call-return. A MAC number may be formed by concatenating the 32 bit MAC tag t with the 32 bit counter value r, with t in the least significant bits position and r in the most significant bits position.

Figure 4:
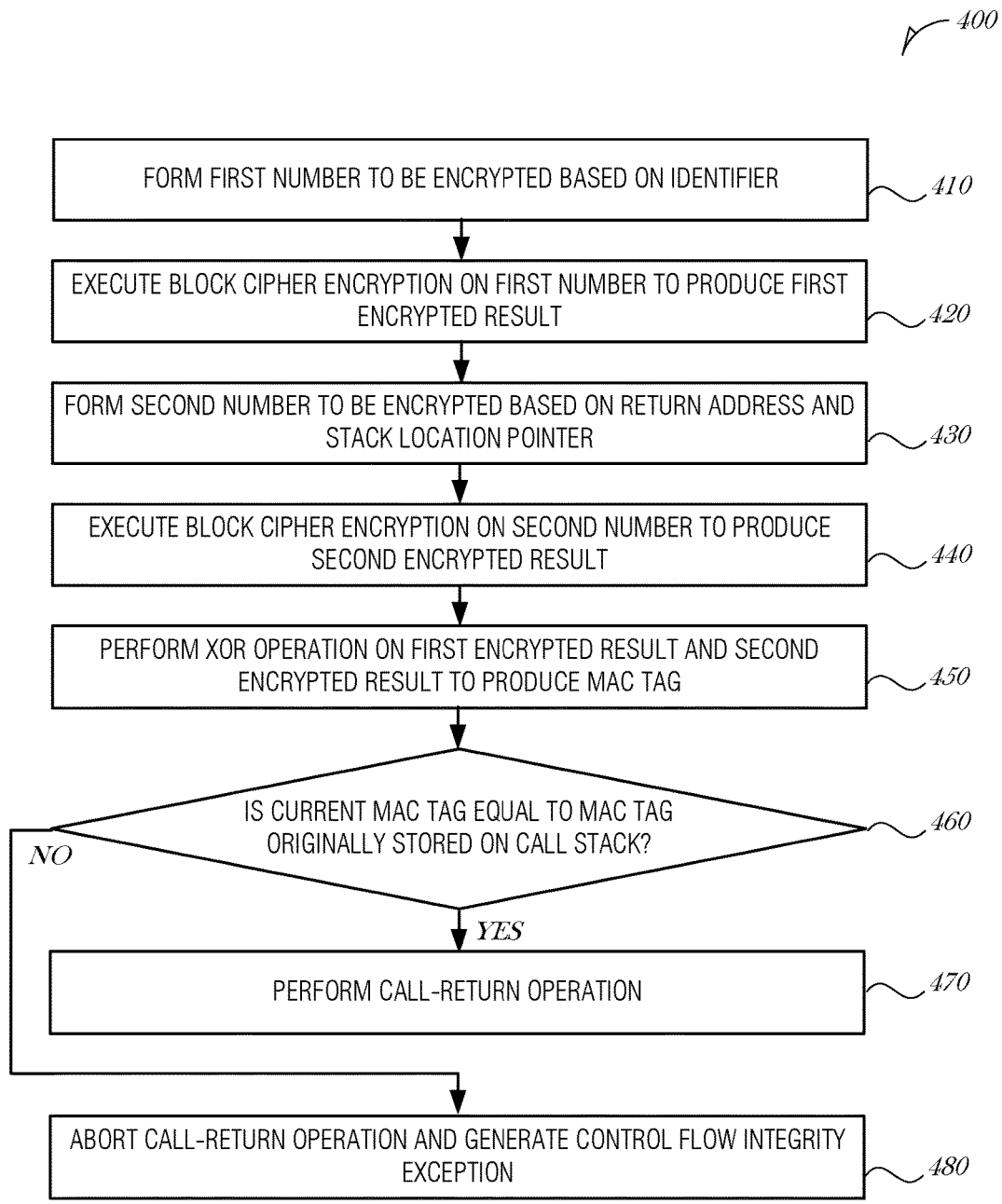
FIG. 4 is a flow diagram illustrating a method of performing cryptographically secure control flow enforcement during a call-return operation, according to an embodiment.

FIG. 4 is a flow diagram illustrating a method 400 of performing cryptographically secure control flow enforcement during a call-return operation, according to an embodiment. The method 400 of FIG. 4 may be performed by a computing processor executing a call-return instruction that causes a sequence of instructions beginning at a previously stored return memory address to be executed next rather than the instructions stored in memory locations following the presently executed call-return instruction, in conjunction with electronic circuits configured to perform the operations as described below. The method 400 uses the MAC tag t stored on the call-stack by the method 300 to enforce control flow integrity by ensuring that the return memory address retrieved from its storage location is valid and not changed from its original value when stored during the original call.

In an operation 410, a first number to be encrypted is formed based on an identifier. The identifier may be taken as a decremented 63-bit counter value, designated r. Before the decremented 63-bit counter value is taken, the counter may be decremented so that it matches the value of the counter when the call operation from which the present call-return operation is returning was performed. The first number may be formed by concatenating a zero-valued bit in a most significant bit position with r in a least significant bits position of a 64 bit number.

In an operation 420, a block cipher encryption is executed on the first number including the identifier to produce a first encrypted result. The encryption may be performed using a secure PRINCE block cipher. The encryption may be performed during a single processor clock cycle.

In an operation 430, a second number to be encrypted is formed based on a return address retrieved from its storage location and a stack location pointer. A 32 bit return address may be concatenated in a most significant bits position with a least significant 31 bits of the stack location pointer in a least significant bits position to form a binary number M. The second number may be formed by concatenating a one-valued bit in a most significant bit position with M in a least significant bits position of a 64 bit number.

In an operation 440, a block cipher encryption is executed on the second number based on the return address retrieved from its storage location and the current stack location pointer to produce a second encrypted result. The encryption may be performed using a secure PRINCE block cipher. The encryption may be performed during a single processor clock cycle. The block cipher encryption of operation 420 and the block cipher encryption of operation 440 may be performed in parallel with one another by separate encryption circuits.

In an operation 450, an XOR operation is performed on the first encrypted result and the second encrypted result to produce a MAC tag t. The result of the XOR operation may be a 64 bit value t', and the MAC tag t may be taken as the most significant 32 bits of t'.

In an operation 460, the current MAC tag t is compared with the MAC tag t previously stored on the call-stack to verify the integrity of the return address during the call-return.

In an operation 470, if the current MAC tag t matches the MAC tag t stored on the call-stack, then the call-return operation is performed and execution proceeds as normal.

In an operation 480, if the current MAC tag t does not match the MAC tag t stored on the call-stack, then the call-return operation is aborted and a control flow integrity exception is generated to address the breach in control flow integrity.

Figure 5:
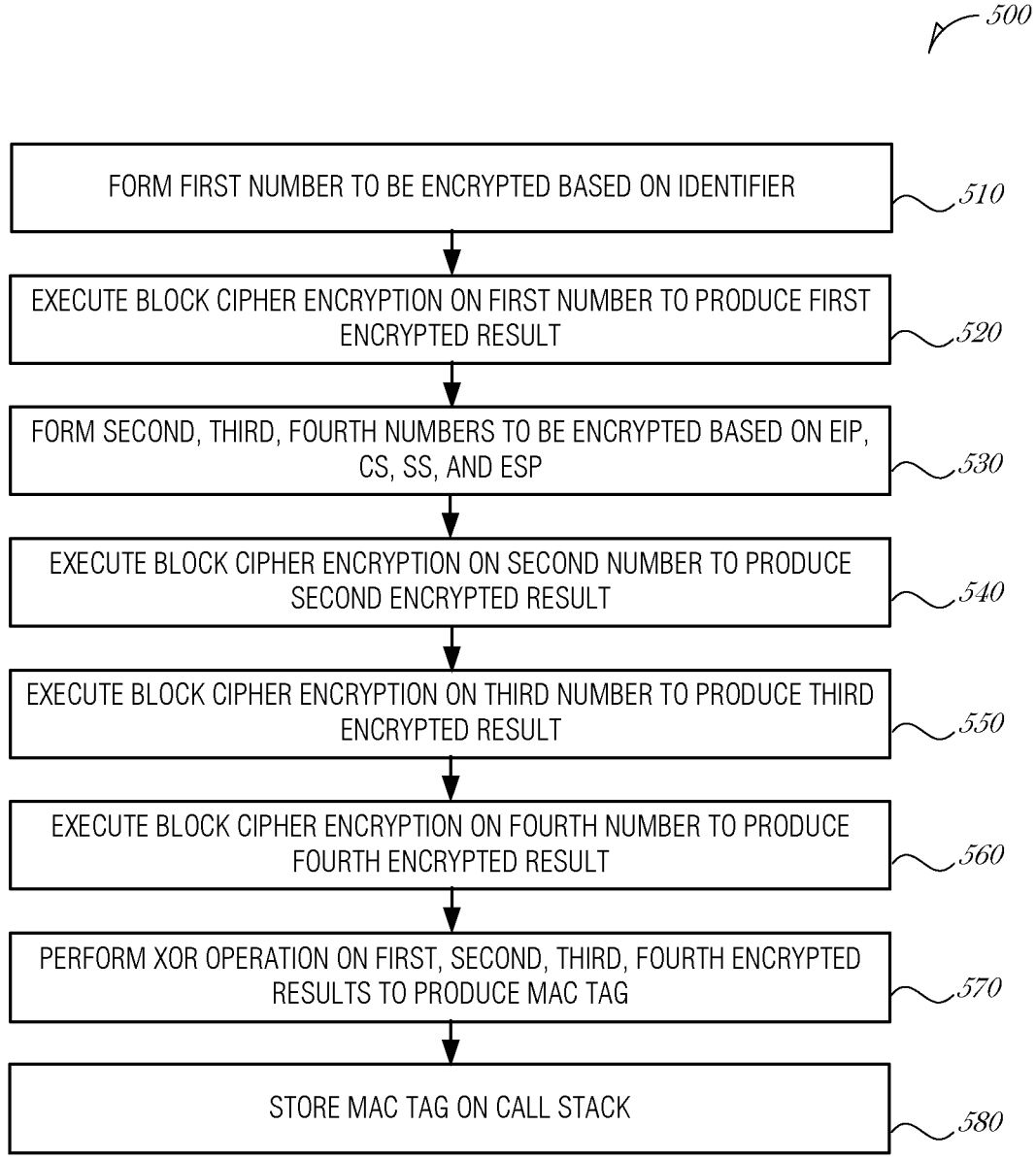
FIG. 5 is a flow diagram illustrating a method of performing cryptographically secure control flow enforcement during an interrupt operation, according to an embodiment.

FIG. 5 is a flow diagram illustrating a method 500 of performing cryptographically secure control flow enforcement during an interrupt operation, according to an embodiment. The method 500 of FIG. 5 may be performed by a computing processor in conjunction with electronic circuits configured to perform the operations as described below. In the method 500, when performing an interrupt that causes a sequence of instructions beginning at a specified memory address of an interrupt handler to be executed next rather than the instructions stored in memory locations following the presently executed instruction, the computing processor may prepare and store encrypted information to be later used in method 600 to authenticate a return address (EIP) retrieved from its storage location, a value of a code segment register (CS), a value of a stack segment register (SS), and the stack pointer (ESP) before resuming execution of a sequence of instructions at the stored return address while returning from the interrupt handler. Each of the EIP, CS, SS, and ESP may be 32 bits, so that the total concatenated number is 128 bits long.

In an operation 510, a first number to be encrypted is formed based on an identifier. The identifier may be taken as a current 32-bit counter value, designated r. After the current 32-bit counter value is taken, the counter may be incremented for its next use. The first number may be formed by concatenating 32 zero-valued bits in a most significant bit position with r in a least significant bits position of a 64 bit number.

In an operation 520, a block cipher encryption is executed on the first number including the identifier to produce a first encrypted result. The encryption may be performed using a secure PRINCE block cipher. The encryption may be performed during a single processor clock cycle.

In an operation 530, second, third, and fourth numbers to be encrypted are formed based on the EIP, CS, SS, and ESP. A 128-bit number M may be formed by concatenating the 32-bit values of EIP, CS, SS, and ESP. The 128-bit number M may then be padded to a total of 183 bits to form a padded number M' by concatenating 55 zero-valued bits in the least significant bits position with the number M in the most significant bits position. Then, the number M' is partitioned into three 61 bit blocks M1, M2, and M3. The second number may be formed by concatenating a one-valued bit in the most significant bit position with a two-bit identifier '01' in the next most significant bit positions and with the block M1 in the least significant bits position. The third number may be formed by concatenating a one-valued bit in the most significant bit position with a two-bit identifier '10' in the next most significant bit positions and with the block M2 in the least significant bits position. The fourth number may be formed by concatenating a one-valued bit in the most significant bit position with a two-bit identifier '11' in the next most significant bit positions and with the block M3 in the least significant bits position.

In an operation 540, a block cipher encryption is executed on the second number to produce a second encrypted result. The encryption may be performed using a secure PRINCE block cipher. The encryption may be performed during a single processor clock cycle. The block cipher encryption of operation 520 and the block cipher encryption of operation 540 may be performed in parallel with one another by separate encryption circuits. The block cipher encryption of operation 520 and the block cipher encryption of operation 540 may be performed sequentially by a same encryption circuit by storing the first encrypted result computed in operation 520 for later use while the second encrypted result is computed in operation 540.

In an operation 550, a block cipher encryption is executed on the third number to produce a third encrypted result. The encryption may be performed using a secure PRINCE block cipher. The encryption may be performed during a single processor clock cycle. The block cipher encryption of any of operations 520, 540, and 550 may be performed in parallel with one another by separate encryption circuits. The block cipher encryption of any of operations 520, 540, and 550 may be performed sequentially by a same encryption circuit by storing the encrypted results computed in one or more of operations 520, 540, and 550 for later use while other encrypted results are computed in others of operations 520, 540, and 550.

In an operation 560, a block cipher encryption is executed on the fourth number to produce a fourth encrypted result. The encryption may be performed using a secure PRINCE block cipher. The encryption may be performed during a single processor clock cycle. The block cipher encryption of any of operations 520, 540, 550, and 560 may be performed in parallel with one another by separate encryption circuits. The block cipher encryption of any of operations 520, 540, 550, and 560 may be performed sequentially by a same encryption circuit by storing the encrypted results computed in one or more of operations 520, 540, 550, and 560 for later use while other encrypted results are computed in others of operations 520, 540, 550, and 560.

In an operation 570, an XOR operation is performed on the first, second, third, and fourth encrypted results to produce a message authentication code (MAC) tag. The result of the XOR operation may be a 64 bit value t', and the MAC tag t may be taken as the most significant 32 bits of t'. A MAC number may be formed by concatenating the 32 bit MAC tag t with the 32 bit counter value r, with t in the most significant bits position and r in the least significant bits position.

In an operation 580, the MAC tag t is stored on a call-stack to be later used to verify the integrity of the return address during an interrupt-return, or a return from the interrupt handler.

Figure 6:
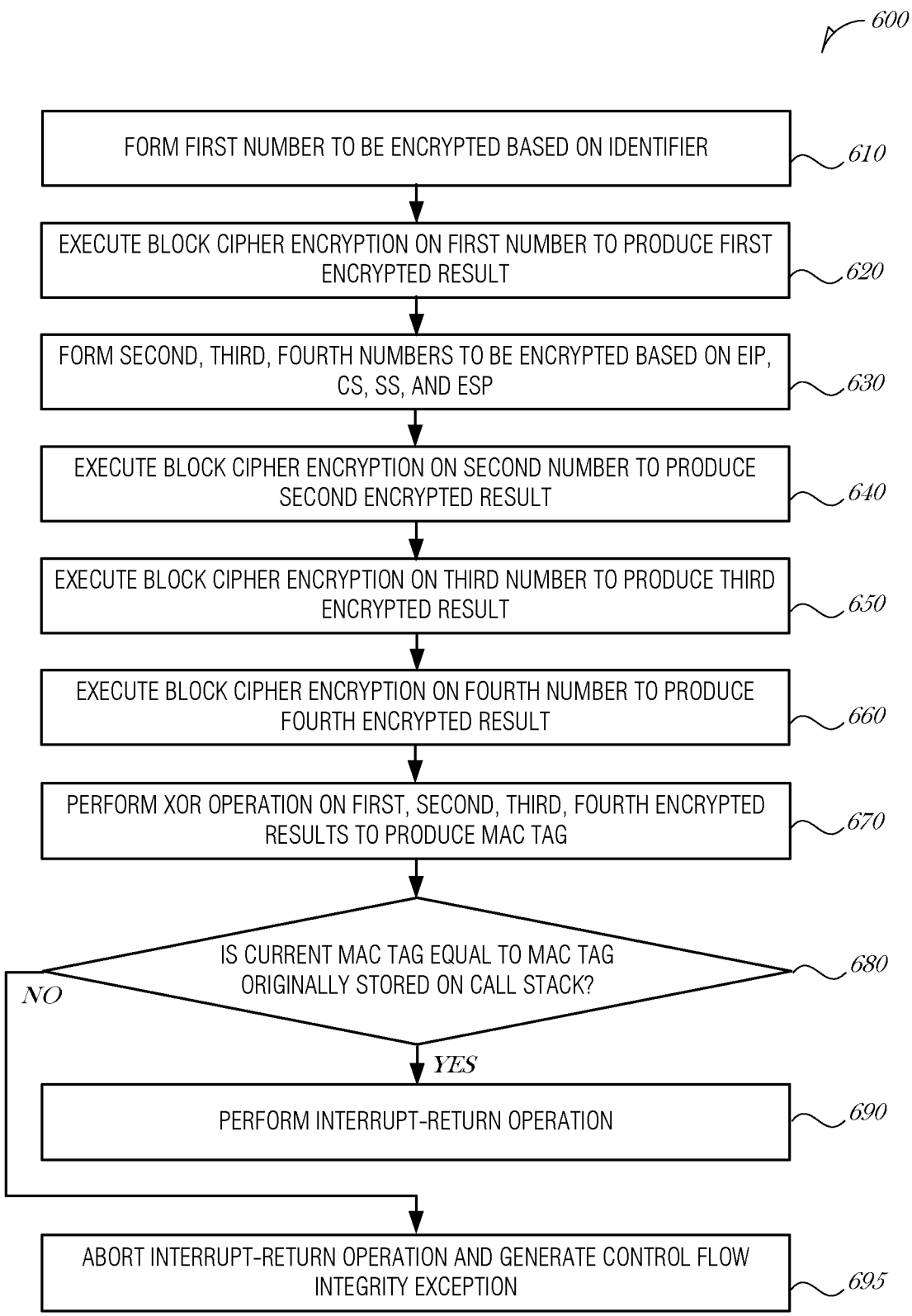
FIG. 6 is a flow diagram illustrating a method of performing cryptographically secure control flow enforcement during an interrupt return operation, according to an embodiment.

FIG. 6 is a flow diagram illustrating a method 600 of performing cryptographically secure control flow enforcement during an interrupt return operation, according to an embodiment. The method 600 of FIG. 6 may be performed by a computing processor in conjunction with electronic circuits configured to perform the operations as described below. The method 600 uses the MAC tag t stored on the call-stack by the method 500 to enforce control flow integrity.

In an operation 610, a first number to be encrypted is formed based on an identifier. The identifier may be taken as a decremented 32-bit counter value, designated r. Before the decremented 32-bit counter value is taken, the counter may be decremented to match the counter value prior to the most recent interrupt. The first number may be formed by concatenating 32 zero-valued bits in a most significant bit position with r in a least significant bits position of a 64 bit number.

In an operation 620, a block cipher encryption is executed on the first number including the identifier to produce a first encrypted result.

In an operation 630, second, third, and fourth numbers to be encrypted are formed based on the stored EIP, CS, SS, and ESP. A 128-bit number M may be formed by concatenating the 32-bit values of the stored EIP, CS, SS, and ESP. The 128-bit number M may then be padded to a total of 183 bits to form a padded number M' by concatenating 55 zero-valued bits in the least significant bits position with the number M in the most significant bits position. Then, the number M' may be partitioned into three 61 bit blocks M1, M2, and M3. The second number may be formed by concatenating a one-valued bit in the most significant bit position with a two-bit identifier '01' in the next most significant bit positions and with the block M1 in the least significant bits position. The third number may be formed by concatenating a one-valued bit in the most significant bit position with a two-bit identifier '10' in the next most significant bit positions and with the block M2 in the least significant bits position. The fourth number may be formed by concatenating a one-valued bit in the most significant bit position with a two-bit identifier '11' in the next most significant bit positions and with the block M3 in the least significant bits position.

In an operation 640, a block cipher encryption is executed on the second number to produce a second encrypted result.

In an operation 650, a block cipher encryption is executed on the third number to produce a third encrypted result.

In an operation 660, a block cipher encryption is executed on the fourth number to produce a fourth encrypted result.

In an operation 670, an XOR operation is performed on the first, second, third, and fourth encrypted results to produce a message authentication code (MAC) tag. The result of the XOR operation may be a 64 bit value t', and the MAC tag t may be taken as the most significant 32 bits of t'. A MAC number may be formed by concatenating the 32 bit MAC tag t with the 32 bit counter value r, with t in the most significant bits position and r in the least significant bits position.

In an operation 680, the current MAC tag t is compared with the MAC tag t stored on the call-stack to verify the integrity of the return address during the interrupt-return.

In an operation 690, if the current MAC tag t matches the MAC tag t stored on the call-stack, then the interrupt-return operation is performed and execution proceeds as normal.

In an operation 695, if the current MAC tag t does not match the MAC tag t stored on the call-stack, then the interrupt-return operation is aborted and a control flow integrity exception is generated to address the breach in control flow integrity.

Below are example embodiments of the systems and techniques discussed above:

Example 1 is a system for computing processor control flow enforcement, the system comprising: a block cipher encryption circuit to execute a block cipher encryption on a first number including an identifier to produce a first encrypted result and execute a block cipher encryption on a second number including a return address and a stack location pointer to produce a second encrypted result; and an exclusive-OR (XOR) circuit to perform an XOR operation on the first encrypted result and the second encrypted result to produce a message authentication code (MAC) tag.

In Example 2, the subject matter of Example 1 optionally includes a MAC number generator circuit to concatenate a binary representation of the MAC tag with a binary representation of the identifier to form a MAC number.

In Example 3, the subject matter of Example 2 optionally includes wherein the MAC number generator circuit generates the MAC number in one clock cycle of a computing processor of the system.

In Example 4, the subject matter of any one or more of Examples 1-3 optionally includes a MAC tag storing circuit to store the MAC tag on a call-stack.

In Example 5, the subject matter of any one or more of Examples 1-4 optionally includes a MAC tag comparator circuit to compare the MAC tag with a stored MAC tag retrieved from a call-stack.

In Example 6, the subject matter of any one or more of Examples 1-5 optionally includes an identifier generator circuit to generate the identifier based on a random number; an identifier storing circuit to store the identifier in an identifier storage memory location when processing a call or interrupt; and an identifier retrieving circuit to retrieve the identifier from the identifier storage memory location when processing a call-return or interrupt-return.

In Example 7, the subject matter of any one or more of Examples 1-6 optionally includes an identifier generator circuit including a counter circuit to generate the identifier based on a counter value; a counter incrementing circuit to increment the counter when processing a call or interrupt; and a counter decrementing circuit to decrement the counter when processing a call-return or interrupt-return.

In Example 8, the subject matter of any one or more of Examples 1-7 optionally includes wherein the block cipher encryption circuit includes a secure PRINCE block cipher circuit.

In Example 9, the subject matter of any one or more of Examples 1-8 optionally includes wherein the block cipher encryption circuit includes a single-clock-cycle cryptographic circuit.

In Example 10, the subject matter of any one or more of Examples 1-9 optionally includes a binary number padding circuit to pad a binary representation of at least one of the first number and the second number to have a same number of bits as the other of the first number and the second number.

In Example 11, the subject matter of any one or more of Examples 1-10 optionally includes wherein the block cipher encryption circuit is configured to encrypt a 64 bit number using a 128 bit key.

In Example 12, the subject matter of any one or more of Examples 1-11 optionally includes a second number generator circuit to generate the second number by concatenating binary representations of the return address and the stack location pointer together.

In Example 13, the subject matter of any one or more of Examples 1-12 optionally includes a second number generator circuit to generate the second number by concatenating a 32 bit return address with the least significant 31 bits of the stack location pointer together to form a 63 bit number.

In Example 14, the subject matter of any one or more of Examples 1-13 optionally includes wherein the most significant 32 bits of the result of performing the XOR operation by the XOR circuit is taken as the MAC tag.

In Example 15, the subject matter of any one or more of Examples 1-14 optionally includes wherein: the block cipher encryption circuit comprises a second number partitioning circuit to partition the second number including the return address and the stack location pointer into multiple blocks of bits, the block cipher encryption circuit executing the block cipher encryption on each of the multiple blocks of bits independently to produce a separate encrypted result for each of the multiple blocks of bits; and the XOR circuit comprises a multi-term XOR circuit to perform the XOR operation on the first encrypted result and each of the separate encrypted results for each of the multiple blocks of bits to produce the MAC tag.

In Example 16, the subject matter of Example 15 optionally includes wherein the second number partitioning circuit partitions the second number including the return address and the stack location pointer into three blocks of bits.

In Example 17, the subject matter of any one or more of Examples 15-16 optionally includes wherein the block cipher encryption circuit executes the block cipher encryption on each of the multiple blocks of bits separately using a same cryptographic circuit in turn.

In Example 18, the subject matter of any one or more of Examples 15-17 optionally includes wherein the block cipher encryption circuit comprises a plurality of separate cryptographic circuits, the plurality of separate cryptographic circuits executing the block cipher encryption on a respective different one of the multiple blocks of bits in parallel with one another.

In Example 19, the subject matter of any one or more of Examples 15-18 optionally includes a binary number padding circuit to pad a binary representation of the second number including the return address and the stack location pointer with zero-valued bits to have a total number of bits that is evenly divisible by a count of the multiple blocks of bits into which the second number including the return address and the stack location pointer is partitioned.

In Example 20, the subject matter of any one or more of Examples 15-19 optionally includes wherein the second number partitioning circuit concatenates each of the multiple blocks of bits into which the number including the return address and the stack location pointer is partitioned with one or more unique identifier bits.

In Example 21, the subject matter of any one or more of Examples 1-20 optionally includes wherein the second number further includes a code segment register value and a stack segment register value.

Example 22 is a method of control flow enforcement for a computing processor, the method comprising: executing a block cipher encryption on a first number including an identifier to produce a first encrypted result; executing a block cipher encryption on a second number including a return address and a stack location pointer to produce a second encrypted result; and performing an exclusive-OR (XOR) operation on the first encrypted result and the second encrypted result to produce a message authentication code (MAC) tag.

In Example 23, the subject matter of Example 22 optionally includes wherein a binary representation of the MAC tag is concatenated with a binary representation of the identifier to form a MAC number.

In Example 24, the subject matter of Example 23 optionally includes wherein the MAC number is generated in one clock cycle of the computing processor.

In Example 25, the subject matter of any one or more of Examples 22-24 optionally includes storing the MAC tag on a call-stack.

In Example 26, the subject matter of any one or more of Examples 22-25 optionally includes comparing the MAC tag with a stored MAC tag retrieved from a call-stack.

In Example 27, the subject matter of Example 26 optionally includes performing a call-return or interrupt-return, wherein the comparing is performed during the performing of the call-return or interrupt-return.

In Example 28, the subject matter of Example 27 optionally includes generating an exception if the MAC tag does not match the stored MAC tag as a result of the comparing.

In Example 29, the subject matter of any one or more of Examples 22-28 optionally includes wherein the identifier includes a random number, and the method further comprises: storing the identifier in an identifier storage memory location when processing a call or interrupt; and retrieving the identifier from the identifier storage memory location when processing a call-return or interrupt-return.

In Example 30, the subject matter of any one or more of Examples 22-29 optionally includes wherein the identifier includes a counter value, and the method further comprises: incrementing the counter when processing a call or interrupt; and decrementing the counter when processing a call-return or interrupt-return.

In Example 31, the subject matter of any one or more of Examples 22-30 optionally includes wherein the block cipher encryption includes a secure PRINCE block cipher.

In Example 32, the subject matter of any one or more of Examples 22-31 optionally includes wherein executing the block cipher encryption includes executing a single-clock-cycle cryptographic circuit.

In Example 33, the subject matter of any one or more of Examples 22-32 optionally includes wherein a binary representation of at least one of the first number and the second number is padded to have a same number of bits as the other of the first number and the second number.

In Example 34, the subject matter of any one or more of Examples 22-33 optionally includes wherein executing the block cipher encryption includes encrypting a 64 bit number using a 128 bit key.

In Example 35, the subject matter of any one or more of Examples 22-34 optionally includes wherein the second number is formed by concatenating binary representations of the return address and the stack location pointer together.

In Example 36, the subject matter of any one or more of Examples 22-35 optionally includes wherein the second number is formed by concatenating a 32 bit return address with the least significant 31 bits of the stack location pointer to form a 63 bit number.

In Example 37, the subject matter of any one or more of Examples 22-36 optionally includes wherein the MAC tag is taken as the most significant 32 bits of the product of performing the XOR operation.

In Example 38, the subject matter of any one or more of Examples 22-37 optionally includes wherein: executing the block cipher encryption on the second number including the return address and the stack location pointer comprises: partitioning the second number including the return address and the stack location pointer into multiple blocks of bits; and executing the block cipher encryption on each of the multiple blocks of bits independently to produce a separate encrypted result for each of the multiple blocks of bits; and performing the XOR operation on the first encrypted result and the second encrypted result comprises additionally performing the XOR operation on each of the separate encrypted results for each of the multiple blocks of bits to produce the MAC tag.

In Example 39, the subject matter of Example 38 optionally includes wherein partitioning the second number including the return address and the stack location pointer into multiple blocks of bits comprises partitioning the second number including the return address and the stack location pointer into three blocks of bits.

In Example 40, the subject matter of Example 39 optionally includes wherein a plurality of executions of the block cipher encryption is performed separately using a same cryptographic circuit in turn.

In Example 41, the subject matter of any one or more of Examples 38-40 optionally includes wherein executing the block cipher encryption on each of the multiple blocks of bits independently comprises executing the block cipher encryption on a respective different one of the multiple blocks of bits by a plurality of separate cryptographic circuits in parallel with one another.

In Example 42, the subject matter of any one or more of Examples 38-41 optionally includes wherein the second number including the return address and the stack location pointer is padded with zero-valued bits to have a total number of bits that is evenly divisible by a count of the multiple blocks of bits into which the second number including the return address and the stack location pointer is partitioned.

In Example 43, the subject matter of any one or more of Examples 38-42 optionally includes wherein each of the multiple blocks of bits into which the number including the return address and the stack location pointer is partitioned is concatenated with one or more unique identifier bits.

In Example 44, the subject matter of any one or more of Examples 22-43 optionally includes wherein the second number further includes a code segment register value and a stack segment register value.

Example 45 is at least one machine-readable medium including instructions that, when executed by a machine, cause the machine to perform operations of any of the methods of Examples 22-44.

Example 46 is an apparatus comprising means for performing any of the methods of Examples 22-44.

Example 47 is a system for performing control flow enforcement in a computing processor, the system comprising: means for executing a block cipher encryption on a first number including an identifier to produce a first encrypted result; means for executing a block cipher encryption on a second number including a return address and a stack location pointer to produce a second encrypted result; and means for performing an exclusive-OR (XOR) operation on the first encrypted result and the second encrypted result to produce a message authentication code (MAC) tag.

In Example 48, the subject matter of Example 47 optionally includes wherein a binary representation of the MAC tag is concatenated with a binary representation of the identifier to form a MAC number.

In Example 49, the subject matter of Example 48 optionally includes wherein the MAC number is formed in one clock cycle of the computing processor.

In Example 50, the subject matter of any one or more of Examples 47-49 optionally includes means for storing the MAC tag on a call-stack.

In Example 51, the subject matter of any one or more of Examples 47-50 optionally includes means for comparing the MAC tag with a stored MAC tag retrieved from a call-stack.

In Example 52, the subject matter of Example 51 optionally includes means for performing a call-return or interrupt-return, wherein the means for comparing the MAC tag performs the comparing during the performing of the call-return or interrupt-return.

In Example 53, the subject matter of Example 52 optionally includes means for generating an exception if the MAC tag does not match the stored MAC tag as a result of the comparing.

In Example 54, the subject matter of any one or more of Examples 47-53 optionally includes wherein the identifier includes a random number, and the system further comprises: means for storing the identifier in an identifier storage memory location when processing a call or interrupt; and means for retrieving the identifier from the identifier storage memory location when processing a call-return or interrupt-return.

In Example 55, the subject matter of any one or more of Examples 47-54 optionally includes wherein the identifier includes a counter value, and the system further comprises: means for incrementing the counter when processing a call or interrupt; and means for decrementing the counter when processing a call-return or interrupt-return.

In Example 56, the subject matter of any one or more of Examples 47-55 optionally includes wherein the block cipher encryption includes a secure PRINCE block cipher.

In Example 57, the subject matter of any one or more of Examples 47-56 optionally includes wherein the means for executing the block cipher encryption includes means for executing a single-clock-cycle cryptographic circuit.

In Example 58, the subject matter of any one or more of Examples 47-57 optionally includes wherein a binary representation of at least one of the first number and the second number is padded to have a same number of bits as the other of the first number and the second number.

In Example 59, the subject matter of any one or more of Examples 47-58 optionally includes wherein the means for executing the block cipher encryption includes means for encrypting a 64 bit key.

In Example 60, the subject matter of any one or more of Examples 47-59 optionally includes wherein the second number is formed by means for concatenating binary representations of the return address and the stack location pointer together.

In Example 61, the subject matter of any one or more of Examples 47-60 optionally includes wherein the second number is formed by means for concatenating a 32 bit return address with the least significant 31 bits of the stack location pointer to form a 63 bit number.

In Example 62, the subject matter of any one or more of Examples 47-61 optionally includes wherein the MAC tag is taken as the most significant 32 bits of the product of performing the XOR operation.

In Example 63, the subject matter of any one or more of Examples 47-62 optionally includes wherein: the means for executing the block cipher encryption on the second number including the return address and the stack location pointer comprises: means for partitioning the second number including the return address and the stack location pointer into multiple blocks of bits; and means for executing the block cipher encryption on each of the multiple blocks of bits independently to produce a separate encrypted result for each of the multiple blocks of bits; and the means for performing the XOR operation on the first encrypted result and the second encrypted result comprises means for performing the XOR operation on each of the separate encrypted results for each of the multiple blocks of bits to produce the MAC tag.

In Example 64, the subject matter of Example 63 optionally includes wherein the means for partitioning the second number including the return address and the stack location pointer into multiple blocks of bits comprises means for partitioning the second number including the return address and the stack location pointer into three blocks of bits.

In Example 65, the subject matter of Example 64 optionally includes wherein the means for executing a block cipher encryption on a second number performs a plurality of executions of the block cipher encryption separately using a same cryptographic circuit in turn.

In Example 66, the subject matter of any one or more of Examples 63-65 optionally includes wherein the means for executing the block cipher encryption on each of the multiple blocks of bits independently comprises means for executing the block cipher encryption on a respective different one of the multiple blocks of bits by a plurality of separate cryptographic circuits in parallel with one another.

In Example 67, the subject matter of any one or more of Examples 63-66 optionally includes wherein the second number including the return address and the stack location pointer is padded with zero-valued bits to have a total number of bits that is evenly divisible by a count of the multiple blocks of bits into which the second number including the return address and the stack location pointer is partitioned.

In Example 68, the subject matter of any one or more of Examples 63-67 optionally includes wherein each of the multiple blocks of bits into which the number including the return address and the stack location pointer is partitioned is concatenated with one or more unique identifier bits.

In Example 69, the subject matter of any one or more of Examples 47-68 optionally includes wherein the second number further includes a code segment register value and a stack segment register value.

Example 70 is a system configured to perform operations of any one or more of Examples 1-69.

Example 71 is a method for performing operations of any one or more of Examples 1-69.

Example 72 is a machine readable medium including instructions that, when executed by a machine cause the machine to perform the operations of any one or more of Examples 1-69.

Example 73 is a system comprising means for performing the operations of any one or more of Examples 1-69.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term "hardware module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computer, laptop computer, tablet computer, server, smart phone, etc.

Figure 7:
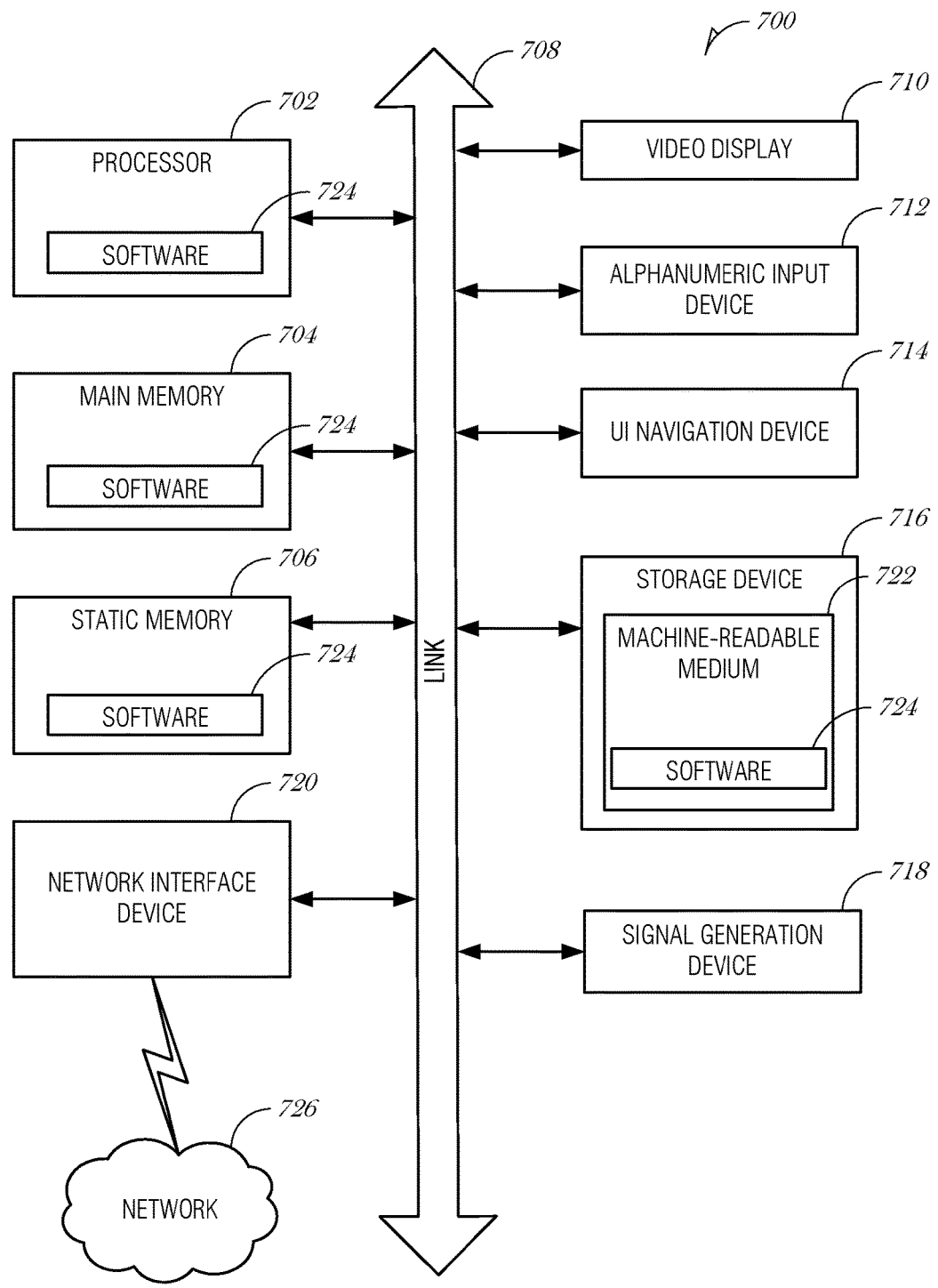
FIG. 7 is an example machine upon which any of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

The computer system 700 includes at least one processor 702 (e.g., a central processing unit (CPU), a GPU, or both, processor cores, compute nodes, etc.), a main memory 704, and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712, and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a GPS sensor, compass, accelerometer, gyrometer, magnetometer, or other sensor.

The storage device 716 includes a machine-readable medium 722 on which is stored one or more sets of data structures and software 724 (e.g., instructions) embodying or utilized by any one or more of the methodologies or functions described herein. The instructions 724 may also reside, completely or at least partially, within the main memory 704, within the static memory 706, and/or within the processor 702 during execution thereof by the computer system 700, with the main memory 704, the static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communication network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for computing processor control flow enforcement, the system comprising:
    a block cipher encryption circuit to execute a block cipher encryption on a first number including an identifier to produce a first encrypted result and execute a block cipher encryption on a second number including a return address, a stack location pointer, a code segment register value, and a stack segment register value to produce a second encrypted result, wherein the block cipher encryption circuit comprises a second number partitioning circuit to partition the second number into multiple blocks of bits, the block cipher encryption circuit executing the block cipher encryption on each of the multiple blocks of bits independently to produce a separate encrypted result for each of the multiple blocks of bits;
    an exclusive-OR (XOR) circuit to perform an XOR operation on the first encrypted result and the second encrypted result to produce a message authentication code (MAC) tag, wherein the XOR circuit comprises a multi-term XOR circuit to perform the XOR operation on the first encrypted result and each of the separate encrypted results for each of the multiple blocks of bits to produce the MAC tag; and
    a MAC tag comparator circuit to compare the MAC tag with a stored MAC tag retrieved from a call-stack.

2. The system of claim 1, further comprising a MAC tag storing circuit to store the MAC tag on a call-stack.

3. The system of claim 1, further comprising: an identifier generator circuit to generate the identifier based on a random number; an identifier storing circuit to store the identifier in an identifier storage memory location when processing a call or interrupt; and an identifier retrieving circuit to retrieve the identifier from the identifier storage memory location when processing a call-return or interrupt-return.

4. The system of claim 1, further comprising: an identifier generator circuit including a counter circuit to generate the identifier based on a counter value; a counter incrementing circuit to increment the counter when processing a call or interrupt; and a counter decrementing circuit to decrement the counter when processing a call-return or interrupt-return.

5. The system of claim 1, wherein the block cipher encryption circuit includes a secure PRINCE block cipher circuit.

6. The system of claim 1, wherein the block cipher encryption circuit includes a single-clock-cycle cryptographic circuit.

7. The system of claim 1, further comprising a second number generator circuit to generate the second number by concatenating binary representations of the return address and the stack location pointer together.

8. The system of claim 1, wherein the block cipher encryption circuit executes the block cipher encryption on each of the multiple blocks of bits separately using a same cryptographic circuit in turn.

9. The system of claim 1, wherein the block cipher encryption circuit comprises a plurality of separate cryptographic circuits, the plurality of separate cryptographic circuits executing the block cipher encryption on a respective different one of the multiple blocks of bits in parallel with one another.

10. A method of control flow enforcement for a computing processor, the method comprising:
    executing a block cipher encryption on a first number including an identifier to produce a first encrypted result;
    executing a block cipher encryption on a second number including a return address, a stack location pointer, a code segment register value, and a stack segment register value to produce a second encrypted result, including:
    partitioning the second number including the return address and the stack location pointer into multiple blocks of bits; and executing the block cipher encryption on each of the multiple blocks of bits independently to produce a separate encrypted result for each of the multiple blocks of bits;
    performing an exclusive-OR (XOR) operation on the first encrypted result and the second encrypted result to produce a message authentication code (MAC) tag, including performing the XOR operation on each of the separate encrypted results for each of the multiple blocks of bits to produce the MAC tag; and
    comparing the MAC tag with a stored MAC tag retrieved from a call-stack.

11. The method of claim 10, further comprising storing the MAC tag on a call-stack.

12. The method of claim 10, further comprising performing a call-return or interrupt-return, wherein the comparing is performed during the performing of the call-return or interrupt-return.

13. The method of claim 12, further comprising generating an exception if the MAC tag does not match the stored MAC tag as a result of the comparing.

14. The method of claim 10, wherein the identifier includes a random number, and the method further comprises: storing the identifier in an identifier storage memory location when processing a call or interrupt; and retrieving the identifier from the identifier storage memory location when processing a call-return or interrupt-return.

15. The method of claim 10, wherein the identifier includes a counter value, and the method further comprises: incrementing the counter when processing a call or interrupt; and decrementing the counter when processing a call-return or interrupt-return.

16. The method of claim 10, wherein the block cipher encryption includes a secure PRINCE block cipher.

17. The method of claim 10, wherein a plurality of executions of the block cipher encryption is performed separately using a same cryptographic circuit in turn.

18. The method of claim 10, wherein executing the block cipher encryption on each of the multiple blocks of bits independently comprises executing the block cipher encryption on a respective different one of the multiple blocks of bits by a plurality of separate cryptographic circuits in parallel with one another.

19. A non-transitory machine-readable medium including instructions that, when executed by a machine, cause the machine to perform the following operations:
    executing a block cipher encryption on a first number including an identifier to produce a first encrypted result;
    executing a block cipher encryption on a second number including a return address, a stack location pointer, a code segment register value, and a stack segment register value to produce a second encrypted result, including:
    partitioning the second number including the return address and the stack location pointer into multiple blocks of bits; and executing the block cipher encryption on each of the multiple blocks of bits independently to produce a separate encrypted result for each of the multiple blocks of bits;
    performing an exclusive-OR (XOR) operation on the first encrypted result and the second encrypted result to produce a message authentication code (MAC) tag, including performing the XOR operation on each of the separate encrypted results for each of the multiple blocks of bits to produce the MAC tag; and
    comparing the MAC tag with a stored MAC tag retrieved from a call-stack.

20. The non-transitory machine-readable medium of claim 19, wherein the block cipher encryption includes a secure PRINCE block cipher.

* * * * *

UNITED STATES PATENT AND TRADEMARK OFFICE
CERTIFICATE OF CORRECTION

PATENT NO. : 10,536,264 B2
APPLICATION NO. : 15/392324
DATED : January 14, 2020
INVENTOR(S) : Ghosh et al.

Page 1 of 1

It is certified that error appears in the above-identified patent and that said Letters Patent is hereby corrected as shown below:

In the Claims

In Column 20, Line 52, in Claim 3, after "comprising:", insert --¶--

In Column 20, Line 54, in Claim 3, after "number;", insert --¶--

In Column 20, Line 56, in Claim 3, after "and", insert --¶--

In Column 20, Line 59, in Claim 4, after "comprising:", insert --¶--

In Column 20, Line 61, in Claim 4, after "value;", insert --¶--

In Column 20, Line 63, in Claim 4, after "and", insert --¶--

In Column 21, Line 30, in Claim 10, after "and", insert --¶--

In Column 22, Line 2-3, in Claim 14, after "comprising:", insert --¶--

In Column 22, Line 4, in Claim 14, after "and", insert --¶--

In Column 22, Line 8, in Claim 15, after "comprises:", insert --¶--

In Column 22, Line 10, in Claim 15, after "and", insert --¶--

In Column 22, Line 36, in Claim 19, after "and", insert --¶--

Signed and Sealed this
Eighteenth Day of August, 2020

Andrei Iancu
*Director of the United States Patent and Trademark Office*